(12) United States Patent
Ota et al.

(10) Patent No.: US 12,280,647 B2
(45) Date of Patent: Apr. 22, 2025

(54) VEHICLE MOUNTED STRUCTURE FOR BATTERY PACK

(71) Applicant: Nissan Motor Co., Ltd., Yokohama (JP)

(72) Inventors: Keiichiro Ota, Kanagawa (JP); Hideki Koike, Kanagawa (JP); Shinichi Matano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 299 days.

(21) Appl. No.: 17/632,252

(22) PCT Filed: Feb. 24, 2021

(86) PCT No.: PCT/JP2021/006837
§ 371 (c)(1),
(2) Date: Feb. 2, 2022

(87) PCT Pub. No.: WO2022/180675
PCT Pub. Date: Sep. 1, 2022

(65) Prior Publication Data
US 2023/0158878 A1    May 25, 2023

(51) Int. Cl.
*B60K 1/04* (2019.01)
*B60K 1/00* (2006.01)
(Continued)

(52) U.S. Cl.
CPC .............. *B60K 1/04* (2013.01); *H01M 10/613* (2015.04); *H01M 10/625* (2015.04);
(Continued)

(58) Field of Classification Search
CPC ................ B60K 1/04; B60K 2001/005; B60K 2001/0438; H01M 10/613; H01M 10/625;
(Continued)

(56) References Cited

U.S. PATENT DOCUMENTS

2011/0206967 A1*  8/2011  Itsuki ................ H01M 10/6556
                                                           429/120
2015/0135940 A1*  5/2015  Rawlinson .......... H01M 10/625
                                                           89/36.08
(Continued)

FOREIGN PATENT DOCUMENTS

| JP | 2020-44880 A | 3/2020 |
| JP | 2020-128138 A | 8/2020 |
| JP | 2020-528377 A | 9/2020 |

*Primary Examiner* — Allison Bourke
*Assistant Examiner* — Robert Gene West
(74) *Attorney, Agent, or Firm* — Global IP Counselors, LLP (57) ABSTRACT

A mounting structure is provided for mounting a battery pack on a floor of a vehicle cabin. The installation structure includes a bottom plate of a housing of the battery pack, cooling pipes provided inside or on a surface of the bottom plate for circulating coolant, and a plate-shaped underguard. The underguard has upwardly protruding ribs and downwardly protruding ribs that are alternately arranged. The cooling pipes are provided inside or on the surface of the bottom plate of the housing. The cooling pipes are arranged to face the downwardly protruding ribs. The underguard is attached to the housing such that a top plate of the upwardly protruding ribs and a bottom plate of the housing are spaced apart.

8 Claims, 8 Drawing Sheets

(51) Int. Cl.
  *H01M 10/613*   (2014.01)
  *H01M 10/625*   (2014.01)
  *H01M 10/6556*  (2014.01)
  *H01M 10/6568*  (2014.01)
  *H01M 50/227*   (2021.01)
  *H01M 50/262*   (2021.01)
  *B60L 50/64*    (2019.01)

(52) U.S. Cl.
  CPC ... *H01M 10/6556* (2015.04); *H01M 10/6568* (2015.04); *H01M 50/227* (2021.01); *H01M 50/262* (2021.01); *B60K 2001/005* (2013.01); *B60K 2001/0438* (2013.01); *B60L 50/64* (2019.02); *H01M 2220/20* (2013.01)

(58) Field of Classification Search
  CPC ......... H01M 10/6556; H01M 10/6568; H01M 50/227; H01M 50/262; H01M 2220/20; B60L 50/64
  USPC ....................................................... 429/120
  See application file for complete search history.

(56) References Cited

U.S. PATENT DOCUMENTS

2015/0249240 A1* 9/2015 Hihara ................ H01M 8/2475
                                          180/68.5
2017/0214008 A9  7/2017 Mardall et al.

\* cited by examiner

VEHICLE MOUNTED STRUCTURE FOR BATTERY PACK

CROSS-REFERENCE TO RELATED APPLICATIONS

This application is a U.S. national stage application of International Application No. PCT/JP2021/006837, filed on Feb. 24, 2021.

BACKGROUND

Technical Field

The present invention relates to an installation structure of a battery pack to a vehicle.

Background Information $CO_2$ emission regulations for vehicles are being required, which is promoting the electrification of vehicles. With the electrification of vehicles, batteries that store electric power for drive motors are being mounted in vehicles. This battery is also charged with electric power regenerated by the power generation motor when the vehicle decelerates (there are occasions when the drive motor generates power). In order to achieve a sufficient driving range, it is necessary to mount a battery having a large capacity, which increases the volume of the battery as well as the weight of the battery. Large, heavy batteries tend to be mounted in the floor of the vehicle cabin, due to mounting space restrictions, as well as restrictions with regard to front-to-rear weight distribution and lowering the center of gravity. In addition, in consideration of heat generated by the battery due to charging/discharging, a cooling system may be incorporated into the battery. US Patent Application Publication No. 2017/0214008 (Patent Document 1), described below, discloses a vehicle in which a battery pack incorporating a liquid cooling system is mounted in the floor of the vehicle cabin.

SUMMARY

Impact from below may be input to a battery pack mounted in the floor of a vehicle cabin, due to unevenness of the road surface, or the like. It is necessary to protect the battery pack from impact from below. In particular, cooling pipes in which coolant circulates are installed inside a battery pack incorporating a liquid cooling system, so that it is necessary to protect the cooling pipes from impact from below. Therefore, an object of the present invention is to provide a structure for mounting a battery pack in a vehicle that can reliably protect a battery pack mounted in the floor of a vehicle cabin.

The present invention is characterized by providing a vehicle mounted structure of a battery pack mounted to the floor of a vehicle cabin. A plate-shaped underguard is provided below a bottom plate of a housing of the battery pack. The underguard has a shape in which upwardly protruding ribs and downwardly protruding ribs are alternately arranged. Cooling pipes provided inside (or on the surface of) the bottom plate of the housing are arranged facing the downwardly protruding ribs. The underguard is attached to the housing such that the top plate of the upwardly protruding ribs and the bottom plate of the housing are spaced apart.

By means of the feature described above, it is possible to provide an installation structure for mounting a battery pack in a vehicle that can reliably protect a battery pack mounted in the floor of a vehicle cabin.

BRIEF DESCRIPTION OF THE DRAWINGS

Referring now to the attached drawings which form a part of this original disclosure.

DETAILED DESCRIPTION OF EMBODIMENT

An installation structure for mounting a battery pack in a vehicle according to the embodiment will be described below with reference to the drawings.

Figure 1:
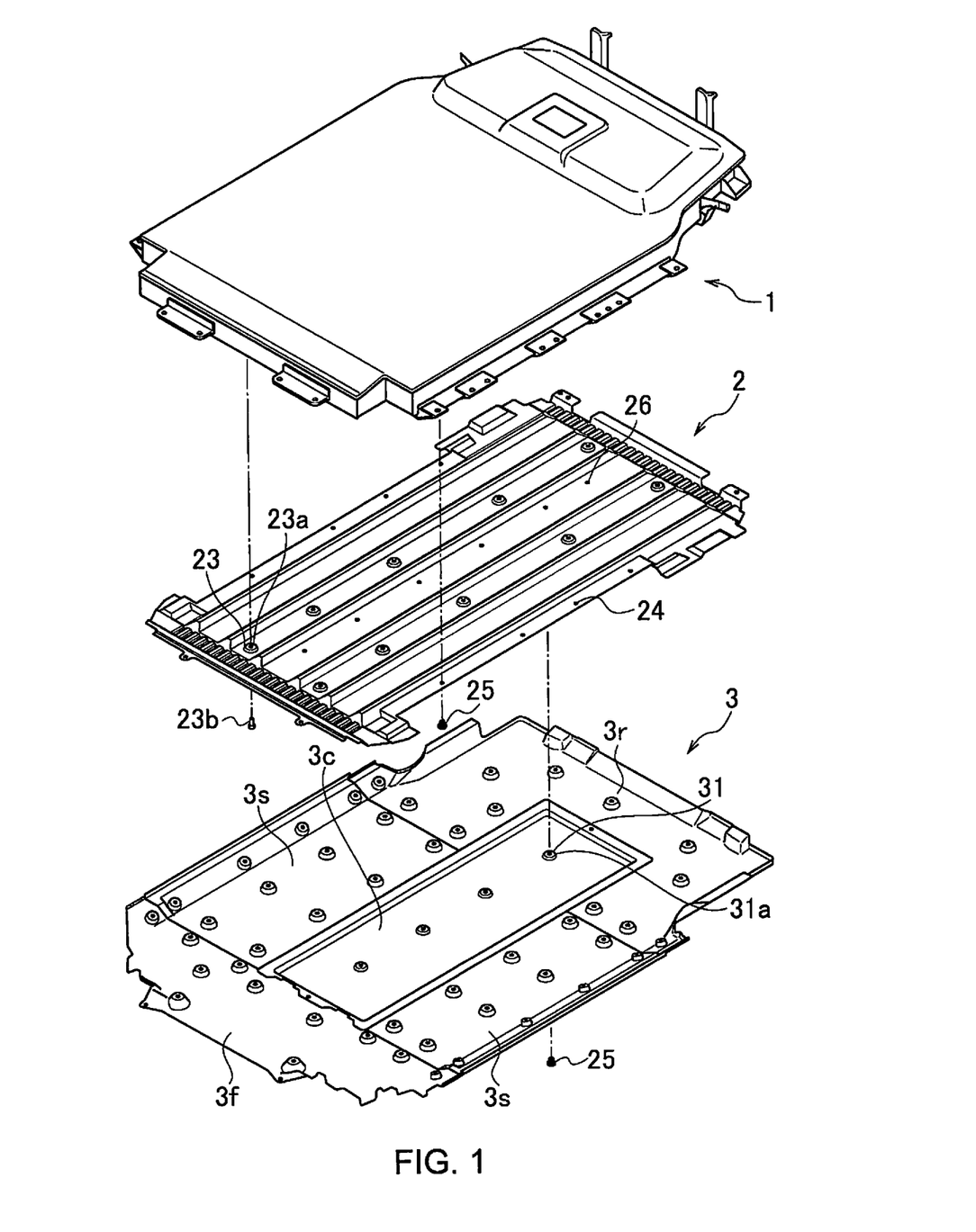
FIG. 1 is an exploded perspective view of an installation structure for mounting a battery pack in a vehicle according to an embodiment.

A battery pack 1 is mounted in a floor of a vehicle cabin. The battery pack 1 occupies almost all of the vehicle cabin floor. As shown in FIG. 1, the installation structure for mounting the battery pack 1 on the vehicle according to the present embodiment has, in addition to the battery pack 1, a metal underguard 2 attached to the battery pack 1 from below, and a resin under cover 3 attached to the underguard 2 from below.

The battery pack 1 includes a housing 10, an upper plate 11 that closes an upper opening of the housing 10, a plurality of battery modules (not shown) housed inside the housing 10, and various electronic devices (not shown) such as harnesses and control modules. A plurality of battery cells are housed inside each battery module. A bottom plate 10*b* of the housing 10 is formed by joining four extruded aluminum materials in the lateral direction of the vehicle (refer to FIG. 2). The extruded materials are welded to each other at flanges 10*f* formed downwardly along the side edges thereof (refer to FIG. 4). A side plate 10*s* of the housing 10 is also formed of an extruded aluminum material and is joined to the peripheral edge of the bottom plate 10*b*. The upper plate 11 is a press-molded metal plate.

Figure 2:
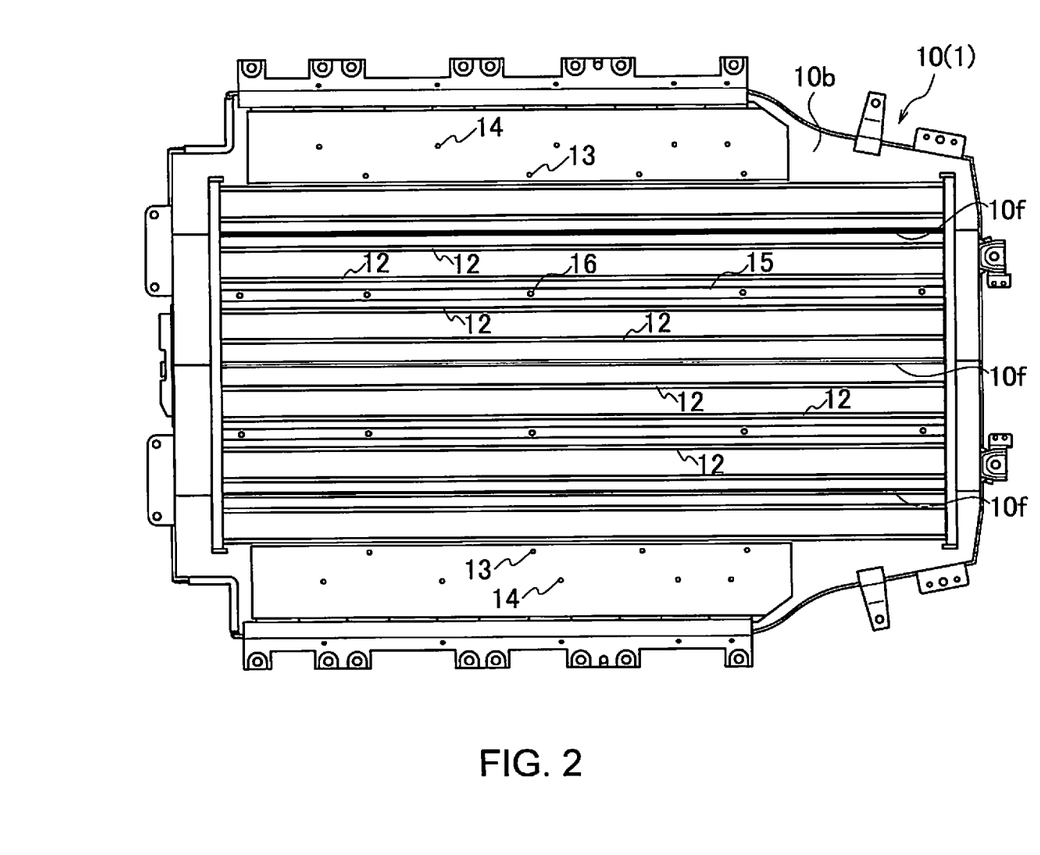
FIG. 2 is a bottom surface view of a battery pack in the above-described structure.
Figure 3:
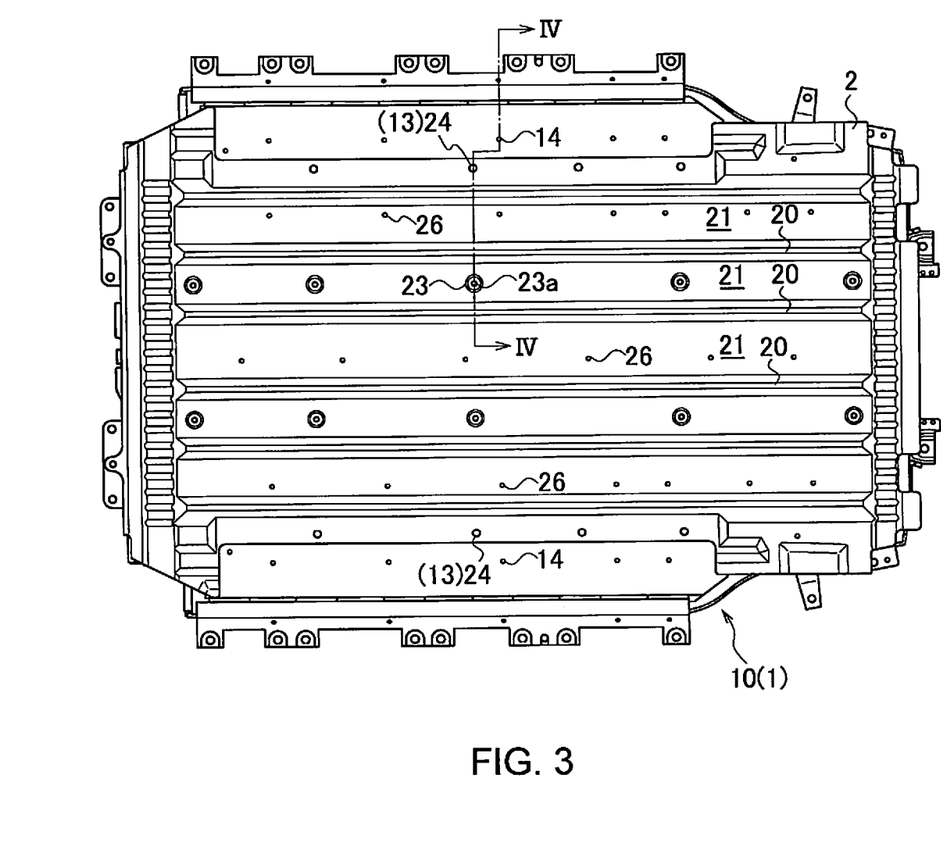
FIG. 3 is a bottom surface view of the battery pack to which an underguard has been attached.
Figure 4:
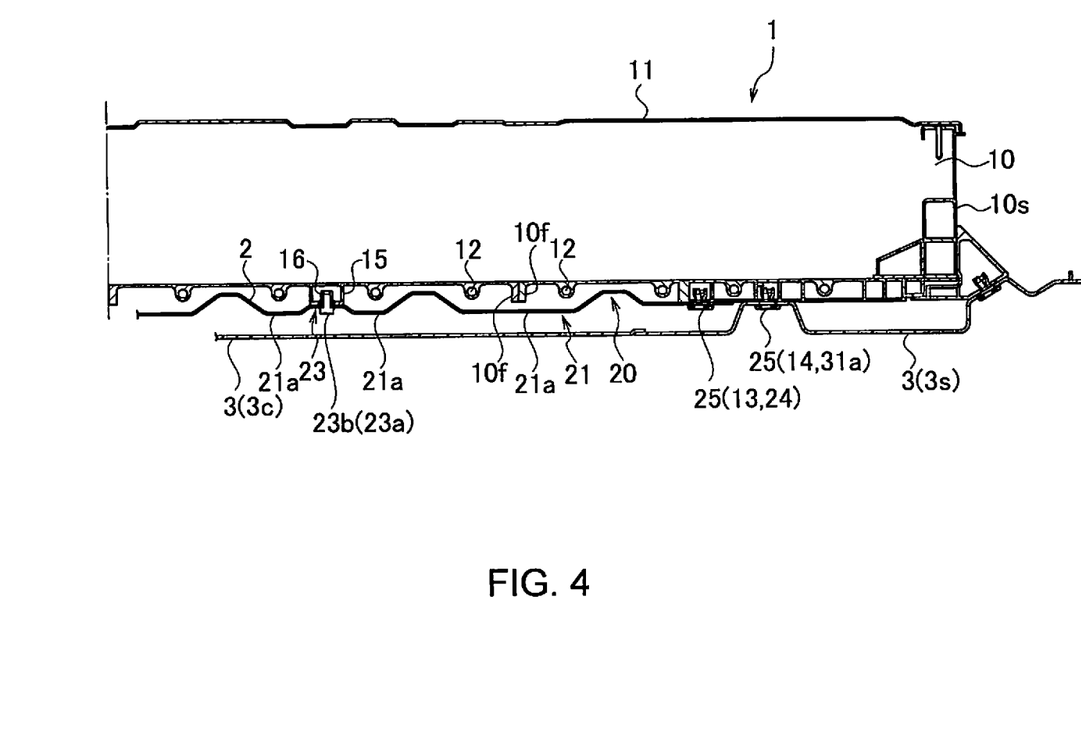
FIG. 4 is a cross-sectional view taken along line IV-IV in FIG. 3.

As shown in FIG. 2, a plurality of brackets are attached to the peripheral edge of the housing 10. The battery pack 1 is fixed to a vehicle body (side sill, for example) via these brackets. The battery pack 1 also functions as a structural member that improves the rigidity and strength of the vehicle body. As shown in FIG. 4, cooling pipes 12 are integrally formed with the bottom plate 10*b* at the time of extrusion molding, and, in the present embodiment, the cooling pipes 12 are embedded inside the bottom plate 10*b*. The cooling pipes 12 are formed so as to protrude downward from the bottom surface of the bottom plate 10*b*. FIG. 4 is a cross-sectional view taken along line IV-IV in FIG. 3 and shows only the left side of the battery pack 1, but the right side is formed symmetrically. FIG. 4 shows the under cover 3, but the under cover 3 is not shown in FIG. 3.

As shown in FIG. 4, four cooling pipes 12 are formed in each of the extruded materials constituting the bottom plate 10b. Each of the cooling pipes 12 extends in the longitudinal direction of the vehicle. The cooling pipes 12 are arranged substantially evenly in the lateral direction. By integrally forming the cooling pipes 12 (as well as the flanges 10f) with the bottom plate 10b, the strength and rigidity of the bottom plate 10b are improved. The upper surface of the bottom plate 10b is flat, which is convenient for laying the battery modules described above thereon, and is convenient for increasing the contact area between the battery modules and the bottom plate 10b. In this manner, by embedding the cooling pipes 12 in the bottom plate 10b and making the upper surface of the bottom plate 10b flat, heat exchange between the battery modules and the coolant flowing inside the cooling pipes 12 can be promoted.

As shown in FIG. 4, the outer sides of two extruded materials on the two sides of the four extruded materials of the bottom plate 10b respectively form a double bottom structure. Two cooling pipes 12 are arranged inside the double bottom structure. Coolant is circulated inside each of the cooling pipes 12. The circulation of the coolant is controlled by a temperature control system (not shown). Temperature sensors are provided in the battery modules, and the like, and the temperature control system controls a circulation pump (not shown) such that the temperature of the battery modules will remain within an appropriate range, based on the detection results of the temperature sensors. Mounting holes 13 to which the two side edges of the underguard 2 are attached and mounting holes 14 of the under cover 3 are formed in the above-described double bottom structure portions of the bottom plate 10b (refer to FIG. 2).

Each of the two central extruded materials of the four extruded materials of the bottom plate 10b has a bracket 15 in the center in the lateral direction thereof. The brackets 15 are also integrally formed during extrusion molding, in the same manner as the cooling pipes 12. The brackets 15 also extend in the longitudinal direction of the vehicle. Each of the brackets 15 forms a closed cross section together with the bottom plate 10b. As shown in FIG. 2, in each of the brackets 15, five blind nuts 16 are spaced apart from each other and fixed by means of swaging.

The underguard 2 is made of aluminum and is press-molded. As shown in FIGS. 3 and 4, the underguard 2 has a corrugated shape in which upwardly protruding ribs (beads, embosses) 20 and downwardly protruding ribs 21 are alternately arranged in the lateral direction. That is, the upwardly protruding ribs 20 and the downwardly protruding ribs 21 extend in the longitudinal direction. The cooling pipes 12 of the housing 10 are arranged facing the downwardly protruding ribs 21. In other words, in bottom surface view (or in plan view), the cooling pipes 12 are positioned within the bounds of the downwardly protruding ribs 21. The front end portion and the rear end portion of the underguard 2 are each bent to form a stepped portion so as to be in contact with the battery pack 1.

An upper plate 20a of the upwardly protruding ribs 20 and the bottom surface of the bottom plate 10b are spaced apart from each other. A lower plate 21a of the downwardly protruding ribs 21 and the cooling pipes 12 are spaced apart from each other. The distance between the lower plate 21a and the cooling pipes 12 is greater than the distance between the upper plate 20a and the bottom surface of the bottom plate 10b. A sloped plate 22 is formed between the upper plate 20a and the lower plate 21a that are adjacent to each other. Five bulges 23 are formed on the lower plate 21a that opposes the above-described bracket 15 to match the positions of the blind nuts 16. Each bulge 23 protrudes upward in a circular shape and is in contact with the bottom surface of the bracket 15.

A bolt hole 23a is formed in the center of the bulge 23, and a bolt 23b, which is a fastener, is inserted into the bolt hole 23a and fastened to the blind nut 16. Mounting holes 24 are formed on both sides of the underguard 2, and the mounting holes 24 match the mounting holes 13 formed on the bottom plate 10b. Resin pins 25, which are fasteners, are attached to the mounting holes 13 and 24. In this mariner, the underguard 2 is attached to the housing 10 by the bolts 23b and the resin pins 25. In addition, mounting holes 26 of the under cover 3 are formed on the lower plate 21a, on which the bulges 23 are not formed.

The under cover 3 is made of resin, and, in the present embodiment, is composed of five parts, a front portion 3f, a rear portion 3r, a central portion 3c, and a pair of side portions 3s, as shown in FIG. 1. These five parts are attached to the underguard 2, thereby forming one under cover 3. A plurality of bulges 31 are formed on the under cover 3. Each bulge 31 protrudes upward in a circular shape and is in contact with the bottom surface (lower plate 21a) of the underguard 2. A mounting hole 31a (refer to FIG. 1) is formed in the center of each bulge 31. The mounting holes 31a match the mounting holes 14 formed on the bottom plate 10b or the mounting holes 26 formed on the underguard 2. The resin pin 25, which is a fastener, is attached to the mounting hole 31a and the mounting hole 14 26. In this manner, the under cover 3 is attached to the underguard 2 by the resin pins 25.

The main purpose of the under cover 3 is to protect the battery pack 1 from water, mud, and the like. On the other hand, the main purpose of the underguard 2 is to protect the battery pack 1 from impact from below. A sound-absorbing material may be attached to the upper surface of the under cover 3. Alternatively, a resin sponge or felt may be press-molded to form the under cover 3. The under cover 3 press-molded in this manner itself has sound-absorbing qualities. In the present embodiment, the front portion 3f, the rear portion 3r, and the side portions 3s are formed by means of injection molding, and the central portion 3c is formed by means of the above-described press-molding.

Next, shock absorption by the underguard 2 when impact is input to the battery pack 1 from below due to unevenness or obstacles on the road surface will be described with reference to FIGS. 5A-5D. FIGS. 5A-5D show the portion in the vicinity of where impact was input. Although the under cover 3 is not shown in FIGS. 5A-5D, impact from below is first absorbed by the under cover 3. Mild impact can be absorbed by elastic deformation or plastic deformation of the under cover 3. Moderate impact that cannot be fully absorbed by the deformation of the under cover 3 is absorbed as a result of the resin pins 25 that fix the under cover 3 being pulled out or being broken. That is, the resin pins (fasteners) fixing the under cover 3 can function as fuses.

Figure 5A:
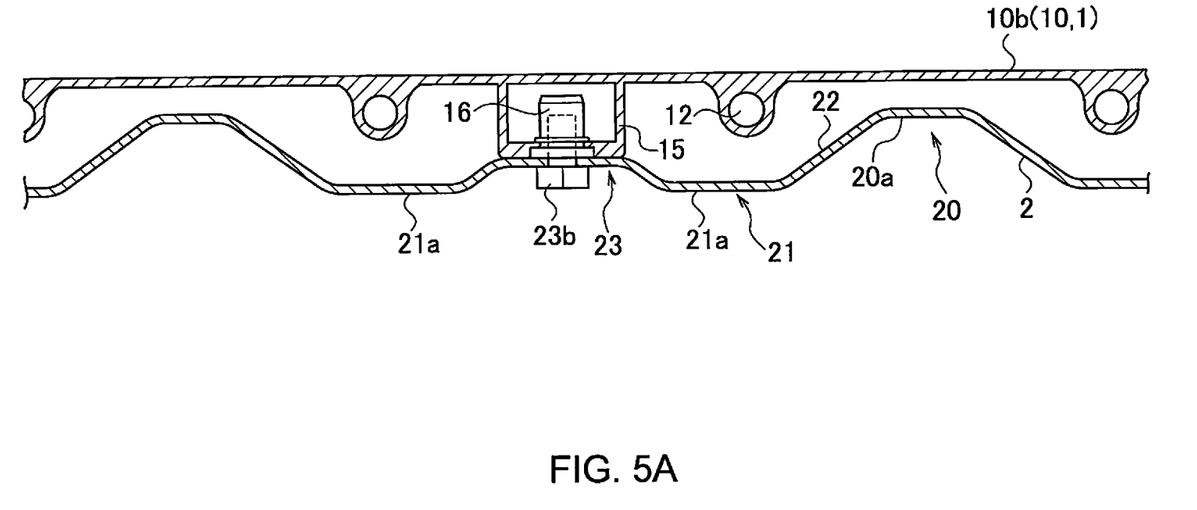
FIG. 5A is a cross-sectional view illustrating a process of shock absorption (initial state) by the above-described structure.

Severe impact that cannot be fully absorbed by the under cover 3 is absorbed by the underguard 2. In such a case, the impact is input to the underguard 2 via the under cover 3. As can be understood from the comparison between FIGS. 5A and 5B, first, the bulges 23, which are the fixing points of the underguard 2, are deformed so as to be crushed, thereby absorbing impact. Because the underguard 2 of the present embodiment is made of metal, the deformation of the underguard 2 can effectively absorb the impact energy. The deformation shown in FIG. 5B occurs because the bottom plate 10b and the upper plate 20a of the upwardly protruding ribs 20 are spaced apart from each other. In addition, as shown in FIG. 5A, the cooling pipes 12 are arranged facing the downwardly protruding ribs 21, and because the cooling pipes 12 and the lower plate 21a of the downwardly protruding ribs 21 are spaced apart from each other, the underguard 2 does not come in contact with the cooling pipes 12 even in the state shown in FIG. 5B.

Figure 5B:
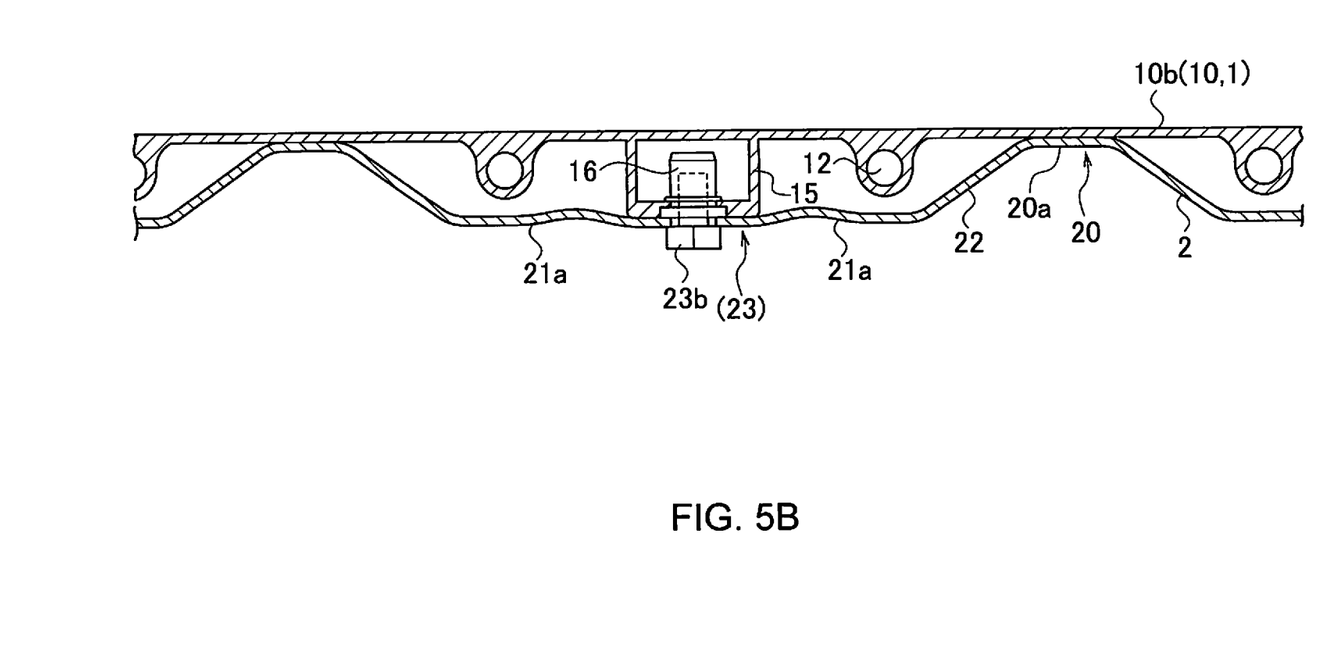
FIG. 5B is a cross-sectional view illustrating the process of shock absorption (first state) by the above-described structure.

The deformation shown in FIG. 5B continues until the upper plate 20a comes in contact with the bottom plate 10b. Subsequently, as can be understood from the comparison between FIGS. 5B and 5C, the sloped plate 22 and the lower plate 21a of the downwardly protruding ribs 21 on the outside of the bulges 23 deform, thereby absorbing the impact. At this time, because the upper plate 20a is already in contact with the bottom plate 10b, the deformed lower plate 21a or the sloped plate 22 is not likely to come in contact with the cooling pipes 12. Even if the lower plate 21a or the sloped plate 22 comes in contact with the cooling pipes 12, the lower plate 21a or the sloped plate 22 deforms, rather than the cooling pipes 12. As shown in FIG. 4, a deformation similar to this deformation can occur in the flanges 10f, which serve as the joint portions of the extruded materials constituting the bottom plate 10b (refer to FIG. 4).

Figure 5C:
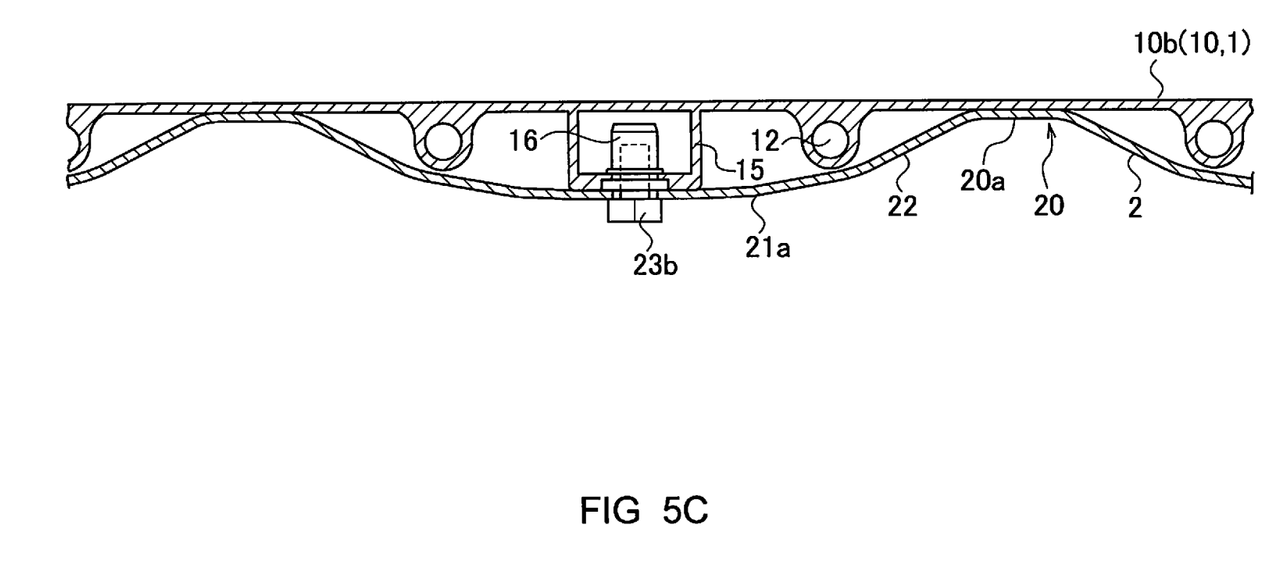
FIG. 5C is a cross-sectional view illustrating the process of shock absorption (second state) by the above-described structure.
Figure 5D:
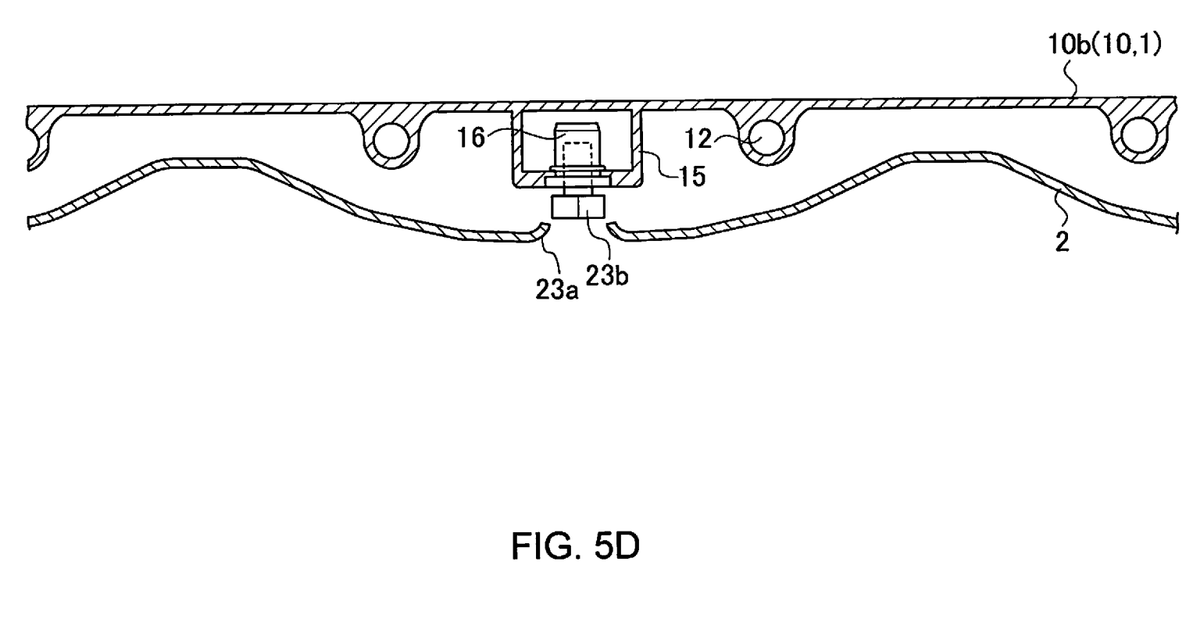
FIG. 5D is a cross-sectional view illustrating the process of shock absorption (third state) by the above-described structure.

If the deformation shown in FIG. 5C still cannot fully absorb the impact, as can be understood from the comparison between FIGS. 5C and 5D, the impact acts on the bolt hole 23a of the underguard 2 and deforms (breaks) the periphery of the bolt hole 23a. This deformation (damage) around the bolt hole 23a further absorbs the impact. The probability that all of the bolt holes 23a will break at the same time is extremely low, which prevents the underguard 2 from falling off of the vehicle. As a result of the shock absorption by means of the deformation of the underguard 2 as shown in FIGS. 5A to 5D, the bottom plate 10b, that is, the battery pack 1 is protected from the impact. Because the bracket 15 has a closed cross section, the bracket 15 exhibits sufficient strength and rigidity against the deformation of the underguard 2 shown in FIGS. 5A-5D.

Unevenness and foreign objects on the road surface may directly hit the bulges 23. In this case, in addition to the deformation described above, it is conceivable that the head portion of the bolt 23b may break, or that the blind nut 16 may be pulled out and the bracket 15 damaged. Even in such a case, impact is absorbed by means of the breakage of the bolt 23b and the pulling out of the blind nut 16. In the case of the blind nut 16 being pulled out, the bracket 15 will be damaged but damage of the battery pack 1 will be limited to the bracket 15, and the function of the battery pack 1 will not be impaired. The cooling pipes 12 will also be protected by the underguard 2.

Here, a case was described in which the deformation of the underguard 2 proceeds from the state shown in FIG. 5A to the state shown in FIG. 5D. However, there are cases in which all of the impact can be absorbed in the state shown in FIG. 5B or 5C. In addition, while it depends on the position where the impact is input, impact is also absorbed as a result of the resin pins 25 (fasteners), which fix the underguard 2, being pulled out or broken. However, deformation around the bolts (fasteners) 23b of the underguard 2 shown in FIGS. 5A-5D can absorb more impact than the resin pins (fasteners) 25 being pulled out or broken.

By means of the present embodiment, the underguard 2 is attached to the housing 10 of the battery pack 1, with the upper plate 20a of the upwardly protruding ribs 20 being spaced apart from the bottom surface of the bottom plate 10b. As a result, as shown in FIGS. 5A-5B, due to the deformation (deformation 1) of the underguard 2 up to where the upper plate 20a comes in contact with the bottom surface of the bottom plate 10b, impact from below is absorbed by the deformation of the underguard 2, thereby protecting the battery pack.

Here, because the cooling pipes 12 are arranged facing the downwardly protruding ribs 21 of the underguard 2, contact between the cooling pipes 12 and the underguard 2 (downwardly protruding ribs 21) is prevented when the underguard 2 deforms, thereby protecting the cooling pipes 12. That is, by means of the present embodiment, the function of the cooling system of the battery pack 1 can also be protected. (The cooling pipes 12 can also be protected by means of the modified example of the arrangement of the cooling pipes 12, described further below.)

In addition, by means of the present embodiment, the cooling pipes 12 protrude downward from the bottom surface of the bottom plate 10b, which facilitates mounting of the battery modules inside the housing 10, and heat exchange with the coolant inside the cooling pipes 12 can be carried out efficiently. Here, if the cooling pipes 12 protrude downward from the bottom surface of the bottom plate 10b, it becomes difficult to protect the cooling pipes 12 from impact from below. However, because the cooling pipes 12, which protrude downward, are spaced apart from the lower plate 21a of the downwardly protruding ribs 21, contact between the deformed underguard 2 (lower plate 21a) and the cooling pipes 12 can be effectively avoided. That is, even the battery pack 1 provided with the cooling pipes 12 protruding downward can be reliably protected by the underguard 2.

In addition, by means of the present embodiment, the bracket 15 forming a closed cross section together with the bottom plate 10b protrude downward from the bottom surface of the bottom plate 10b, and the underguard 2 (bulges 23) is fixed to the bracket 15 by fasteners (bolts 23b). That is, the bottom plate 10b and the fasteners of the underguard 2 to the housing 10 (bracket 15) of the battery pack 1 are spaced apart from each other by the height of the downwardly protruding bracket 15. By means of this configuration, in addition to "deformation 1" described above, as shown in FIGS. 5B-5D, impact from below can be absorbed by the deformation of the underguard 2 to thereby protect the battery pack, by means of the following deformations 2 and 3 of the underguard 2. (Deformation 2) Deformation of the underguard 2 in the range from the upper plate 20a of the upwardly protruding ribs 20 to the lower plate 21a of the downwardly protruding ribs 21. (Deformation 3) Deformation accompanied by damages in the vicinity of the fastener (bolt holes 23a) of the underguard 2 to the housing 10.

Furthermore, by means of the present embodiment, the resin under cover 3 is attached to the bottom surface of the underguard 2. For this reason, the battery pack 1 (and the underguard 2) can be protected from rain and mud, and it is also possible to insulate (or absorb) airborne sounds coming from below the floor. In addition, because impact from below can also be absorbed by means of deformation of the under cover 3, light impact can be fully absorbed by the under cover 3 without deforming the underguard 2. In addition, the under cover 3 is fixed to the bottom surface of the underguard 2 by fasteners (resin pins 25). The fasteners (resin pins 25) function as fuses, so that impact from below can also be absorbed by means of damage to the fasteners (resin pins 25).

The present invention is not limited to the embodiment described above. The cooling pipes 12 are arranged on the bottom surface side of the bottom plate 10b, but may be arranged on the upper surface side (inside the housing 10). The thickness of the bottom plate 10b may be made greater than the inner diameter of the cooling pipes 12, and the cooling pipes 12 may be arranged inside the thickness of the bottom plate 10b (between the bottom surface and the upper surface of the bottom plate 10b). The cooling pipes 12 are embedded in the bottom plate 10b in the above-described embodiment, but may be separately formed and attached to the surface (bottom surface or upper surface) of the bottom plate 10b.

The underguard 2 is made of metal in the above-described embodiment, but may be made of fiber-reinforced plastic (FRP). The bracket 15 extends in the longitudinal direction in the above-described embodiment, but may be provided only at the positions where the underguard 2 is attached (positions of the blind nuts 16). In addition, while referred to as the cooling pipes 12 in the present embodiment, coolant heated by means of electric energy at the time of a cold start can be circulated inside the cooling pipes 12 to thereby warm the battery at an early stage.

The invention claimed is:

1. A vehicle mounted structure of a battery pack mounted to a floor of a vehicle cabin, the vehicle mounted structure comprising:
    a bottom plate of a housing of the battery pack;
    a plurality of cooling pipes provided to the bottom plate for circulating coolant; and
    a plate-shaped underguard provided below the bottom plate,
    the plate-shaped underguard having upwardly protruding ribs, bulges, and downwardly protruding ribs, each upwardly protruding rib or bulge is alternately arranged with each downwardly protruding rib,
    the cooling pipes being arranged to face the downwardly protruding ribs,
    the plate-shaped underguard being attached to the housing such that an upper plate of the upwardly protruding ribs and a bottom surface of the bottom plate are spaced apart from each other without any other structure therebetween, and
    each of the bulges contacting the bottom surface of the bottom plate and being configured to receive a fastener to secure the plate-shaped underguard to the bottom plate.

2. The vehicle mounted structure according to claim 1, wherein
    the cooling pipes protrude downward from the bottom surface of the bottom plate, and a lower plate of the downwardly protruding ribs and the cooling pipes are spaced apart from each other.

3. The vehicle mounted structure according to claim 1, further comprising
    a bracket forming a closed cross section together with the bottom plate protrudes downward from the bottom surface of the bottom plate, and
    the plate-shaped underguard is fixed to the bracket by fasteners.

4. The vehicle mounted structure according to claim 1, further comprising
    a resin under cover attached to a bottom surface of the plate-shaped underguard, and
    the resin under cover being fixed to the bottom surface of the plate-shaped underguard by fasteners.

5. The vehicle mounted structure according to claim 2, further comprising
    a bracket forming a closed cross section together with the bottom plate protrudes downward from the bottom surface of the bottom plate, and
    the plate-shaped underguard is fixed to the bracket by fasteners.

6. The vehicle mounted structure according to claim 2, further comprising
    a resin under cover attached to a bottom surface of the plate-shaped underguard, and
    the resin under cover being fixed to the bottom surface of the plate-shaped underguard by fasteners.

7. The vehicle mounted structure according to claim 3, further comprising
    a resin under cover attached to a bottom surface of the plate-shaped underguard, and
    the resin under cover being fixed to the bottom surface of the plate-shaped underguard by fasteners.

8. The vehicle mounted structure according to claim 5, further comprising
    a resin under cover attached to a bottom surface of the plate-shaped underguard, and
    the resin under cover being fixed to the bottom surface of the plate-shaped underguard by fasteners.

\* \* \* \* \*